United States Patent
Hsiao et al.

(10) Patent No.: US 11,360,622 B2
(45) Date of Patent: Jun. 14, 2022

(54) STACK STRUCTURE AND TOUCH SENSOR

(71) Applicant: Cambrios Film Solutions Corporation, Tortola (VG)

(72) Inventors: Chung-Chin Hsiao, Zhubei (TW); Siou-Cheng Lien, Toufen (TW); Yi-Wen Chiu, Taoyuan (TW); Chia-Yang Tsai, New Taipei (TW)

(73) Assignee: Cambrios Film Solutions Corporation, Tortola (VG)

( * ) Notice: Subject to any disclaimer, the term of this patent is extended or adjusted under 35 U.S.C. 154(b) by 0 days.

(21) Appl. No.: 17/072,368

(22) Filed: Oct. 16, 2020

(65) Prior Publication Data
US 2022/0121320 A1    Apr. 21, 2022

(51) Int. Cl.
*G06F 3/044*    (2006.01)
*G06F 3/047*    (2006.01)

(52) U.S. Cl.
CPC ............ *G06F 3/0445* (2019.05); *G06F 3/047* (2013.01); *G06F 2203/04103* (2013.01)

(58) Field of Classification Search
CPC .................. G06F 3/0445; G06F 3/047; G06F 2203/04103; G06F 3/014; G06F 3/0346; A63F 13/20; A63F 13/211; A63F 13/24; A63F 13/235; A63F 13/212; A63F 13/428
See application file for complete search history.

(56) References Cited

U.S. PATENT DOCUMENTS

| | | | |
|---|---|---|---|
| 2013/0169576 A1* | 7/2013 | Wang | G06F 3/041 345/173 |
| 2014/0048131 A1* | 2/2014 | Tanaka | H01L 31/022425 136/256 |
| 2015/0277616 A1* | 10/2015 | Wang | G06F 3/042 345/174 |
| 2019/0227647 A1* | 7/2019 | Fang | G06F 3/04164 |
| 2020/0097105 A1* | 3/2020 | Yeh | H05K 1/0274 |
| 2020/0097113 A1* | 3/2020 | Fang | G06F 3/04164 |

FOREIGN PATENT DOCUMENTS

| | | |
|---|---|---|
| JP | 2020053004 A | 4/2020 |
| TW | 202022584 A | 6/2020 |

* cited by examiner

*Primary Examiner* — Patrick N Edouard
*Assistant Examiner* — Joseph P Fox
(74) *Attorney, Agent, or Firm* — Cooper Legal Group, LLC

(57) ABSTRACT

A stack structure includes: a substrate, a copper layer disposed on the substrate, a migration-proof layer disposed on the copper layer, and a silver-nanowire layer disposed on the migration-proof layer, wherein the migration-proof layer is made of materials between copper and silver in galvanic series. A touch sensor includes the stack structure.

20 Claims, 4 Drawing Sheets

STACK STRUCTURE AND TOUCH SENSOR

BACKGROUND

1. Field of the Disclosure

The present disclosure relates to stack structures, and in particular to a stack structure comprising a migration-proof layer, and in particular to a touch sensor comprising the stack structure.

2. Description of the Related Art

A stack structure comprising silver nanowires and a copper layer can be applied in a touch sensor. The silver nanowires of the stack structure in a conventional touch sensor are directly coated on the copper layer, and thus Galvanic effect is generated between the copper layer and the silver nanowires whereby silver nanowires amass because of reduction reaction, thereby leading to an increased size and an increased wire diameter of the silver nanowires to the detriment of the yield rate of the stack structure in an etching process and the performance of the touch sensor having therein the stack structure.

BRIEF SUMMARY

An objective of the present disclosure is to provide a stack structure and a touch sensor, such that silver nanowires in the stack structure comprising the silver nanowires and a copper layer do not amass because of reduction reaction and thus do not end up with increased size and increased wire diameter.

To achieve at least the above objective, the present disclosure provides a stack structure, comprising: a substrate, a copper layer disposed on the substrate, a migration-proof layer disposed on the copper layer, and a silver-nanowire layer disposed on the migration-proof layer, wherein the migration-proof layer is made of materials between copper and silver in galvanic series.

Regarding the stack structure, the migration-proof layer is made of an alloy.

Regarding the stack structure, the alloy is one selected from the group consisting of stainless steel, copper nickel alloy, Monel, and Inconel.

Regarding the stack structure, the migration-proof layer is made of a metal.

Regarding the stack structure, the metal is one selected from the group consisting of titanium, molybdenum, tungsten, tin, lead, tantalum, and passivated nickel.

Regarding the stack structure, the substrate is a thin-film substrate.

Regarding the stack structure, the copper layer, the migration-proof layer, and the silver-nanowire layer are patterned.

To achieve at least the above objective, the present disclosure provides a touch sensor comprising the stack structure.

During the etching process, the migration-proof layer in the stack structure of the present disclosure decreases the speed at which the etching process carried out with the one-step etching solution reaches the next layer (e.g., the copper layer) to thereby prevent the incomplete etching of the silver-nanowire layer and excessive etching otherwise caused by the rapid etching of the copper layer during the one-step etching process, so as to effectively increase the process window and yield rate during the one-step etching process. Furthermore, the migration-proof layer reduces silver nanowire etching difficulty, which might otherwise occur because of the amassing of the silver nanowires and the increased size thereof due to a reduction reaction which occurs with respect to the silver-nanowire layer coated on the copper layer. Therefore, the migration-proof layer in the stack structure of the present disclosure is conducive to enhancement of the efficiency of the etching of the silver-nanowire layer, such that the stack structure is suitable for use in the manufacturing process of touch sensors.

Therefore, the migration-proof layer in the stack structure of the present disclosure is conducive to enhanced performance of a touch sensor having the stack structure of the present disclosure by reducing the chance of amassing of the silver nanowires and their increased size and wire diameter due to a reduction reaction which occurs to the silver-nanowire layer.

DETAILED DESCRIPTION

The implementation of the present invention is illustrated by the specific embodiments as follows, so one skilled in the art may understand other advantages and effects of the present invention by the contents disclosed in the specification. The present invention may also be implemented or applied by other embodiments, and the details in the specification may also be based on different views and applications without departing from the spirit of the present invention for various modifications and variations.

Unless otherwise specified, articles "a", "an" and "the" used herein may also be interpreted to be in a plural form.

Unless otherwise specified, the conjunction "or" used herein may also be interpreted to mean "and/or".

The term "galvanic series" used herein is also known as "electrical corrosion series", "voltage series", "primary cell series", "(corrosive) electropotential series", or "electric dipole series" and is descriptive of the trend of the anodic potential or cathodic potential of various materials, such as alloys and metals. To be specific, the term "galvanic series" used herein is restricted to seawater functioning as electrolyte.

The term "passivation" used herein refers to the process of treating a material in order to make a surface of the material resistant to oxidation and thus enhance the capability of the material to resist corrosion.

First Embodiment

Figure 1:
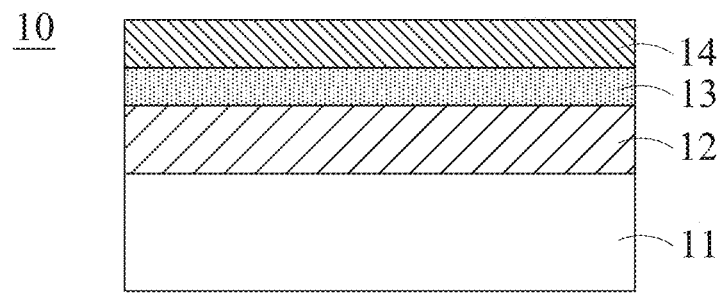
FIG. 1 is a schematic view of a stack structure according to a first embodiment of the present disclosure.

FIG. 1 is a schematic view of a stack structure 10 according to the first embodiment of the present disclosure. Referring to FIG. 1, the stack structure 10 in the first embodiment of the present disclosure comprises: a substrate 11, a copper layer 12 disposed on the substrate 11, a migration-proof layer 13 disposed on the copper layer 12, and a silver-nanowire layer 14 disposed on the migration-proof layer 13, wherein the migration-proof layer 13 is made of materials between copper and silver in galvanic series.

In this embodiment, the substrate 11 is a thin-film substrate, but the present disclosure is not limited thereto, and thus persons skilled in the art can select any other substrate as needed, such as polyethylene terephthalate (PET), cyclic olefin copolymer (COP), or colorless polyimide (CPI). For example, the substrate 11 may be a polymeric transparent plastic substrate with a thickness of 10 μm–150 μm.

In this embodiment, the copper layer 12 is made of pure copper (e.g., 99% copper and 1% or less impurities).

In this embodiment, the migration-proof layer 13 is made of Monel, but the present disclosure is not limited thereto, and thus persons skilled in the art can select any other materials between copper and silver in galvanic series as needed. For instance, in an embodiment, the migration-proof layer 13 is made of an alloy, and the appropriate alloy includes but is not limited to: stainless steel, copper nickel alloy, Monel, or Inconel. In another embodiment, the migration-proof layer 13 is made of a metal, and the appropriate metal includes but is not limited to: titanium, molybdenum, tungsten, tin, lead, tantalum, or passivated nickel.

In this embodiment, the silver-nanowire layer 14 is made of silver nanowires. For illustrative sake, the silver nanowires in the silver-nanowire layer 14 are each 5 μm-20 μm long and 5 μm-30 μm wide, but the present disclosure is not limited thereto.

Figure 2:
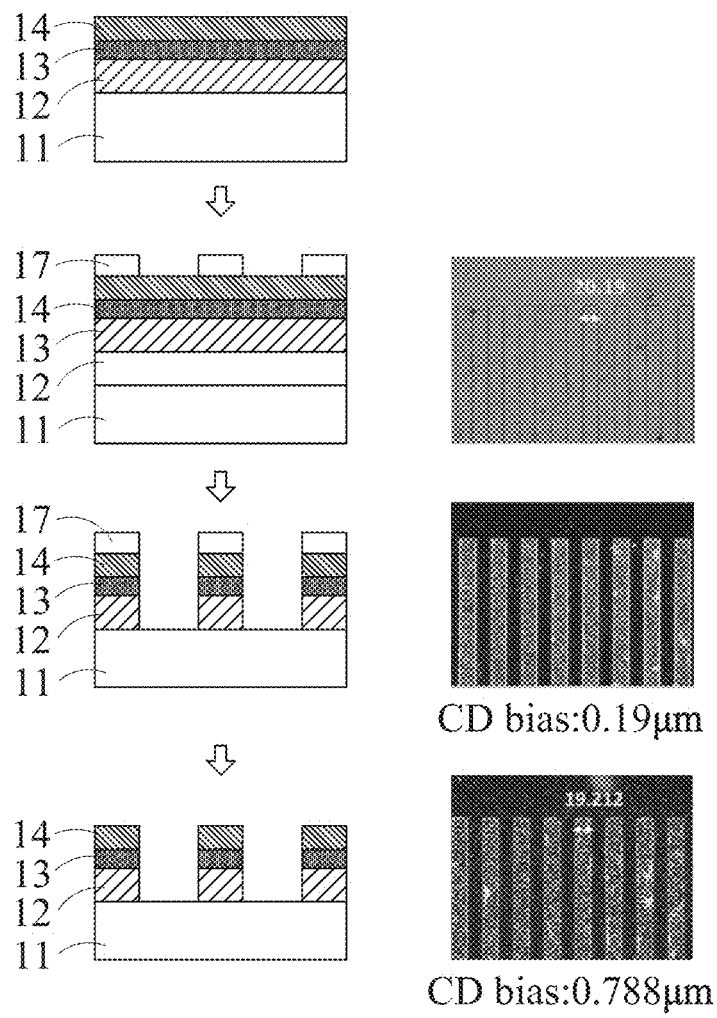
FIG. 2 is a schematic view of a process flow for forming the stack structure according to the first embodiment of the present disclosure.

In the first embodiment, the copper layer 12, the migration-proof layer 13, and the silver-nanowire layer 14 are patterned by the process flow illustrated in FIG. 2. Referring to FIG. 2, the process flow is as follows:

1. provide the stack structure 10 of the first embodiment;
2. form a patterned photoresist 17 on the silver-nanowire layer 14 by lithography;
3. remove, by a one-step etching process, parts of the copper layer 12, the migration-proof layer 13, and the silver-nanowire layer 14 that are not covered with the photoresist 17; and
4. remove the photoresist 17.

The pictures on the right of FIG. 2 are microscopic pictures taken of the stack structure 10 of the first embodiment after the aforesaid steps 2, 3, and 4. As shown by the microscopic pictures in FIG. 2, owning to the migration-proof layer 13, the stack structure 10 of the first embodiment has critical dimension bias (CD bias) less than 1 μm, because of a reduction of lateral etching problems, residual amassed silver nanowires, and incomplete etching.

Second Embodiment

Figure 3:
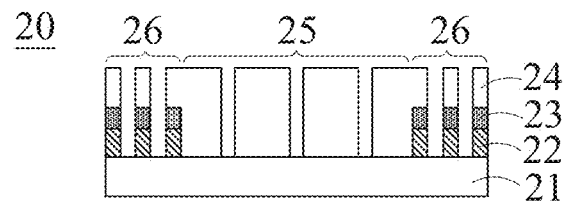
FIG. 3 is a schematic view of a touch sensor according to a second embodiment of the present disclosure.

FIG. 3 is a schematic view of a touch sensor 20 according to the second embodiment of the present disclosure. Referring to FIG. 3, the touch sensor 20 comprises: a substrate 21, a copper layer 22 disposed on the substrate 21, a migration-proof layer 23 disposed on the copper layer 22, and a silver-nanowire layer 24 disposed on the migration-proof layer 23, wherein the migration-proof layer 23 is made of materials between copper and silver in galvanic series.

Referring to FIG. 3, the copper layer 22, the migration-proof layer 23, and the silver-nanowire layer 24 are patterned.

Referring to FIG. 3, in the touch sensor 20 of the second embodiment, the copper layer 22 and the migration-proof layer 23 are disposed on the edge of the substrate 21, defining a visible region 25 wherein the substrate 21 is not covered by the copper layer 22 and the migration-proof layer 23 and a peripheral wiring region 26 wherein the substrate 21 is covered by the copper layer 22 and the migration-proof layer 23 in the stack structure of the touch sensor 20.

The substrate 21, the copper layer 22, the migration-proof layer 23, and the silver-nanowire layer 24 in the second embodiment are made of the same materials as disclosed in the first embodiment, but the present disclosure is not limited thereto.

Figure 4:
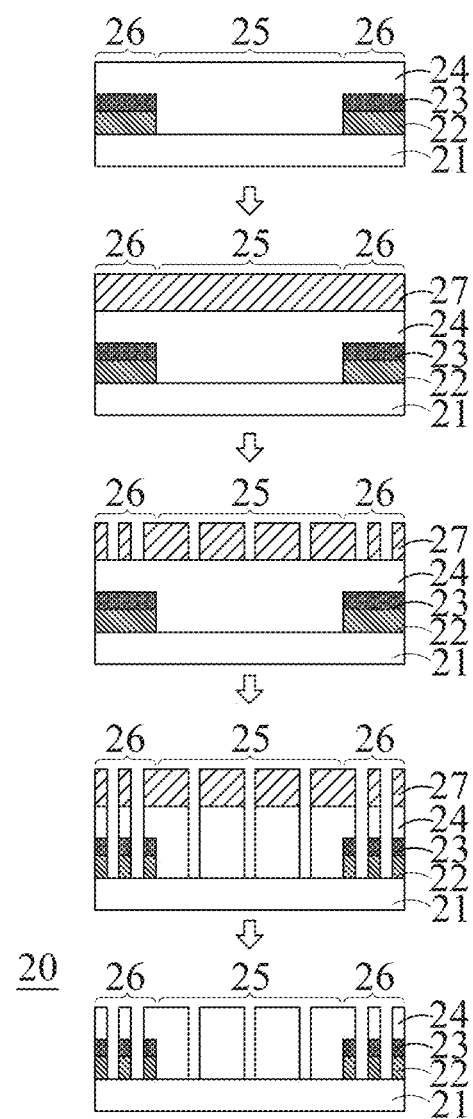
FIG. 4 is a schematic view of a process flow for forming the touch sensor according to a third embodiment of the present disclosure.

The touch sensor 20 of the second embodiment is produced by the process flow illustrated in FIG. 4. Referring to FIG. 4, the process flow is as follows:

1. provide the copper layer 22, the migration-proof layer 23, and the silver-nanowire layer 24 on the substrate 21 sequentially, wherein the copper layer 22 and the migration-proof layer 23 are disposed on the edge of the substrate 21, defining the visible region 25 wherein the substrate 21 is not covered by the copper layer 22 and the migration-proof layer 23 and the peripheral wiring region 26 wherein the substrate 21 is covered by the copper layer 22 and the migration-proof layer 23 in the stack structure of the touch sensor 20;
2. provide a photoresist 27 on the silver-nanowire layer 24;
3. pattern the photoresist 27 by lithography;
4. remove, by a one-step etching process, parts of the copper layer 22, the migration-proof layer 23, and the silver-nanowire layer 24 that are not covered with the photoresist 27; and
5. remove the photoresist 27 to finalize the production of the touch sensor 20 of this embodiment.

First Comparison

Figure 5:
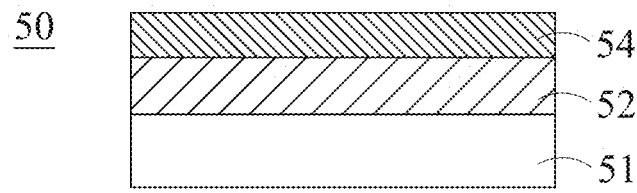
FIG. 5 is a schematic view of a stack structure according to a first comparison.

FIG. 5 is a schematic view of a stack structure 50 according to the first comparison. Referring to FIG. 5, a stack structure 50 of the first comparison comprises: a substrate 51, a copper layer 52 disposed on the substrate 51, and a silver-nanowire layer 54 disposed on the copper layer 52.

The substrate 51, the copper layer 52, and the silver-nanowire layer 54 in the first comparison are made of the same materials as disclosed in the first embodiment. The first comparison is distinguished from the first embodiment by the following technical features: the stack structure 50 of the first comparison does not include the migration-proof layer 13 of the first embodiment, and thus the silver-nanowire layer 54 is directly disposed on the copper layer 52.

First Test

To evaluate the effect of the migration-proof layer on the silver-nanowire layer, the first test involves providing the stack structures of the first embodiment and the first comparison, taking pictures of the microscopic structure of the silver-nanowire layer with a microscope, and comparing the two stack structures in terms of the amassing of the silver nanowires in their respective silver-nanowire layers.

Figure 6:
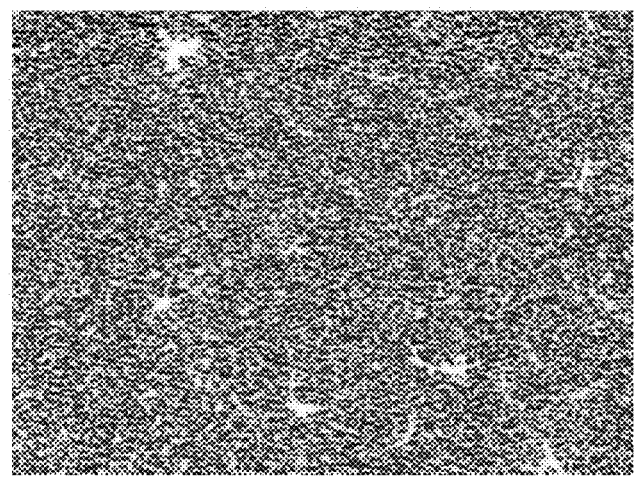
FIG. 6 is a microscopic picture taken of a silver-nanowire layer in the stack structure according to the first embodiment.
Figure 7:
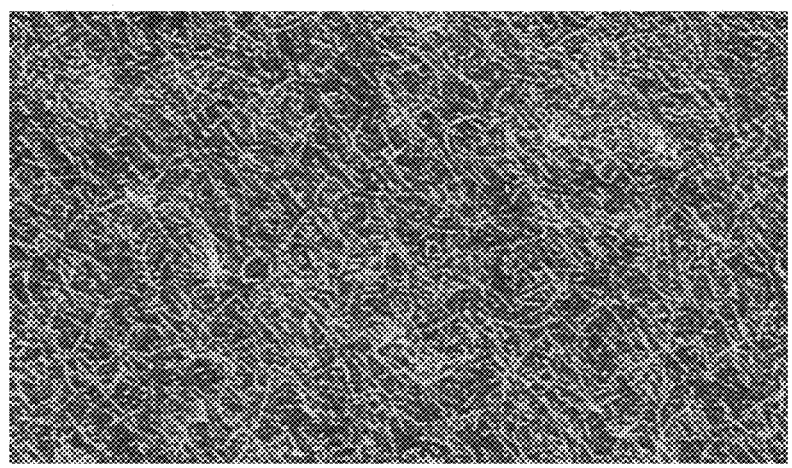
FIG. 7 is a microscopic picture taken of the silver-nanowire layer in the stack structure according to the first comparison.

FIG. 6 is a microscopic picture taken of a silver-nanowire layer 14 in the stack structure 10 according to the first embodiment. FIG. 7 is a microscopic picture taken of the silver-nanowire layer 54 in the stack structure 50 according to the first comparison. Referring to FIG. 6 and FIG. 7, compared with the stack structure 10 of the first embodiment, the stack structure 50 of the first comparison has the following defects: the silver nanowires in the silver-nanowire layer 54 not only amass severely but also thicken, to the detriment of the quality of a subsequent etching process.

Second Test

To evaluate the effect of the migration-proof layer on the etching process of the stack structure, the second test involves providing the stack structure 50 of the first comparison and then patterning the copper layer 52 and silver-nanowire layer 54 in the stack structure 50 of the first comparison in accordance with the process flow disclosed in the first embodiment. The test results are shown in FIG. 8 and FIG. 9.

Figure 8:
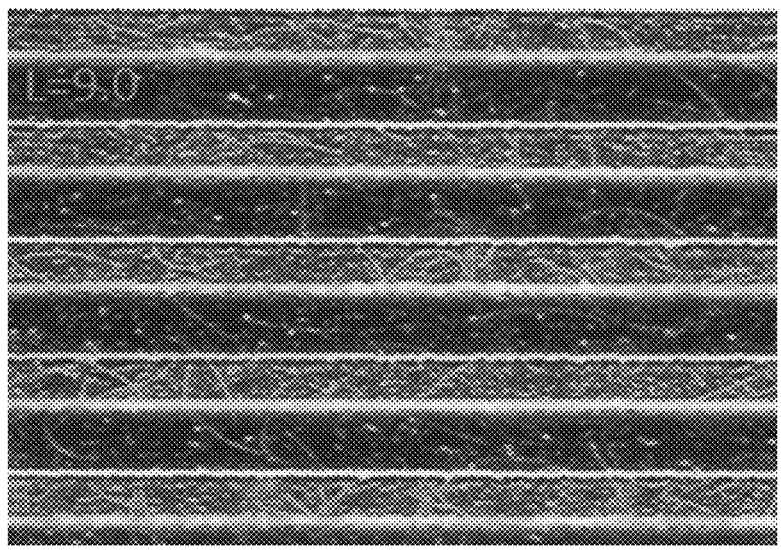
FIG. 8 is a microscopic picture taken of the stack structure with a patterned photoresist according to the first comparison.
Figure 9:
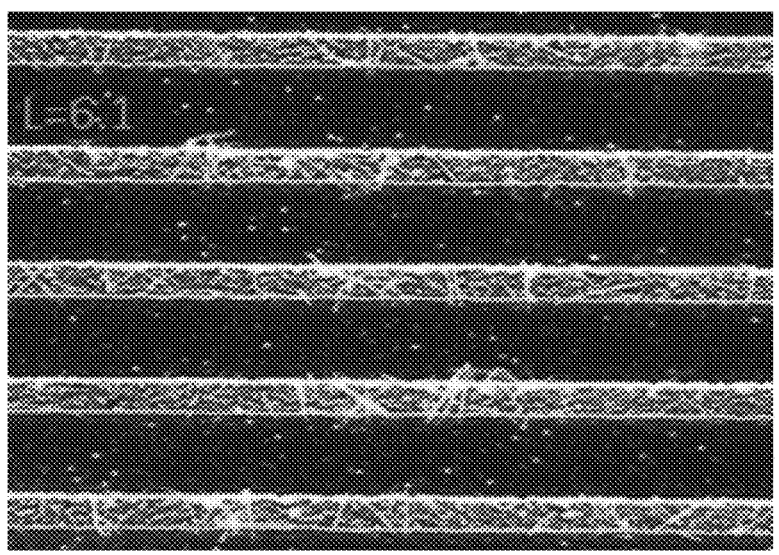
FIG. 9 is a microscopic picture taken of the stack structure after having undergone a one-step etching process and removal of the photoresist according to the first comparison.

FIG. 8 is a microscopic picture taken of the stack structure 50 with a patterned photoresist according to the first comparison. FIG. 9 is a microscopic picture taken of the stack structure 50 after having undergone a one-step etching process and removal of the photoresist according to the first comparison. Referring to FIG. 9, after the stack structure 50 of the first comparison has undergone the patterning process, the amassed silver nanowires render the etching process incomplete, and thus traces of silver nanowires are found in areas (i.e., the dark areas in FIG. 9) to be etched, leading to critical dimension bias (CD bias) of 2.9 μm in FIG. 9.

The findings obtained by the comparison of the test results (FIG. 8 and FIG. 9) of FIG. 2 and the second test are as follows: compared with the stack structure 50 of the first comparison, the stack structure 10 of the first embodiment comprises the migration-proof layer 13 and thus effectively precludes overly great CD bias and residual silver nanowires otherwise caused by an incomplete etching process because of the amassing of silver nanowires.

Third Test

To evaluate the effect of the types of materials which the migration-proof layer is made of on the stack structure, the third test involves providing the stack structure 10 of the first embodiment except the migration-proof layer 13 is made from the other materials, and then observing the effect of the other materials on the degree of the amassing of the silver nanowires in the silver-nanowire layer 14. The test results are shown in Table 1 below.

TABLE 1

| material which migration-proof layer is made of | degree of the amassing of silver nanowires |
|---|---|
| silver | X |
| nickel (passivated) | X |
| copper nickel alloy (25% Ni + 75% Cu) | Δ |
| copper | ○ |

X: not amassing;
Δ: amassing slightly;
○: amassing significantly

The test results in Table 1 show that, in addition to the Monel used in the first embodiment, materials between copper and silver in galvanic series, such as passivated nickel and copper nickel alloys, can preclude the amassing of the silver nanowires in the silver-nanowire layer 14.

In conclusion, the stack structure and the touch sensor comprising the stack structure according to the present disclosure have at least the following advantages:

1. The migration-proof layer not only provides the capability to slow down and delay the excessive etching of the copper layer during the etching process but also functions as a protective layer for the copper layer to prevent oxidation of the copper layer as a result of contact of the copper layer with air and water vapor.

2. The migration-proof layer functions as a buffer layer for preventing the overly speedy etching of the copper layer and the incomplete etching of the silver-nanowire layer (because the etching solution has to etch the migration-proof layer first before etching the other layers, but the etching of the migration-proof layer and the etching of silver-nanowire layer can take place simultaneously.)

3. A conventional stack structure has its silver-nanowire layer directly coated on its copper layer, which causes the Galvanic effect to be produced whereby the silver nanowires in the silver-nanowire layer amass to thereby manifest increased size and increased wire diameter as a result of a reduction reaction. By contrast, the stack structure of the present disclosure has a migration-proof layer, which is effective in preventing the silver nanowires from directly coming into contact with the copper layer to bring about a reaction and reducing the chance of unsatisfactory etching otherwise caused by thickened silver nanowires.

4. After undergoing a test, the stack structure of the present disclosure has the following advantages: the copper layer, the migration-proof layer, and the silver-nanowire layer are patterned by lithography with a one-step etching solution, and the chance of lateral etching problems, the amassing of silver nanowires and traces thereof, and incomplete etching is significantly reduced, thereby achieving CD bias of less than 1 μm.

While the present disclosure has been described by means of specific embodiments, numerous modifications and variations could be made thereto by those skilled in the art without departing from the scope and spirit of the present disclosure set forth in the claims.

What is claimed is:

1. A stack structure, comprising:
   a substrate;
   a copper layer disposed on the substrate;
   a migration-proof layer disposed on the copper layer; and
   a silver-nanowire layer disposed on the migration-proof layer, wherein:
      the migration-proof layer is made of materials between copper and silver in galvanic series, and
      a critical dimension bias of the stack structure is less than 1 μm.

2. The stack structure of claim 1, wherein the migration-proof layer is made of an alloy.

3. The stack structure of claim 2, wherein the alloy is one selected from the group consisting of stainless steel, copper nickel alloy, Monel, and Inconel.

4. The stack structure of claim 1, wherein the migration-proof layer is made of a metal.

5. The stack structure of claim 4, wherein the metal is one selected from the group consisting of titanium, molybdenum, tungsten, tin, lead, tantalum, and passivated nickel.

6. The stack structure of claim 1, wherein the substrate is a thin-film substrate.

7. The stack structure of claim 1, wherein the copper layer, the migration-proof layer, and the silver-nanowire layer are patterned.

8. The stack structure of claim 1, wherein the copper layer and the migration-proof layer are disposed on an edge of the substrate, defining a visible region wherein the substrate is not covered by the copper layer and the migration-proof layer and a peripheral wiring region wherein the substrate is covered by the copper layer and the migration-proof layer in the stack structure.

9. A touch sensor comprising the stack structure of claim 1.

10. The stack structure of claim 1, wherein the migration-proof layer is made of Monel.

11. The stack structure of claim 1, wherein:
in a first region, the silver-nanowire layer is in direct contact with the substrate, and
in a second region, the silver-nanowire layer is spaced apart from the substrate by the migration-proof layer and the copper layer.

12. The stack structure of claim 1, wherein the silver-nanowire layer is in direct contact with a sidewall of the migration-proof layer.

13. The stack structure of claim 1, wherein the silver-nanowire layer is in direct contact with a sidewall of the copper layer.

14. The stack structure of claim 1, wherein:
the silver-nanowire layer is in direct contact with a sidewall of the migration-proof layer and a sidewall of the copper layer.

15. The stack structure of claim 1, wherein a sidewall of the copper layer, a sidewall of the migration-proof layer, and a sidewall of the silver-nanowire layer are co-planar.

16. The stack structure of claim 1, wherein the migration-proof layer is made of Inconel.

17. The stack structure of claim 1, wherein the migration-proof layer is made of a copper nickel alloy.

18. The stack structure of claim 1, wherein nanowires of the silver-nanowire layer are between 5 µm and 20 µm long.

19. A stack structure, comprising:
a substrate;
a copper layer disposed on the substrate;
a migration-proof layer disposed on the copper layer, wherein the migration-proof layer is made of Monel; and
a silver-nanowire layer disposed on the migration-proof layer, wherein the migration-proof layer is made of materials between copper and silver in galvanic series.

20. A stack structure, comprising:
a substrate;
a copper layer disposed on the substrate;
a migration-proof layer disposed on the copper layer, wherein the migration-proof layer is made of Inconel; and
a silver-nanowire layer disposed on the migration-proof layer, wherein the migration-proof layer is made of materials between copper and silver in galvanic series.

* * * * *